United States Patent
Vanyukhin et al.

(10) Patent No.: US 7,895,332 B2
(45) Date of Patent: Feb. 22, 2011

(54) IDENTITY MIGRATION SYSTEM APPARATUS AND METHOD

(75) Inventors: Nikolay Vanyukhin, St.-Petersburg (RU); Oleg Shevnin, St.-Petersburg (RU); Alexey Korotich, St.-Petersburg (RU)

(73) Assignee: Quest Software, Inc., Aliso Viejo, CA (US)

( * ) Notice: Subject to any disclaimer, the term of this patent is extended or adjusted under 35 U.S.C. 154(b) by 308 days.

(21) Appl. No.: 11/926,512

(22) Filed: Oct. 29, 2007

(65) Prior Publication Data

US 2008/0104250 A1 May 1, 2008

Related U.S. Application Data

(60) Provisional application No. 60/863,569, filed on Oct. 30, 2006.

(51) Int. Cl.
*G06F 15/173* (2006.01)
(52) U.S. Cl. .................. 709/226; 709/223; 709/248
(58) Field of Classification Search .................. 709/226
See application file for complete search history.

(56) References Cited

U.S. PATENT DOCUMENTS

| | | | |
|---|---|---|---|
| 4,370,707 A | 1/1983 | Phillips et al. |
| 4,694,397 A | 9/1987 | Grant |
| 5,222,018 A | 6/1993 | Sharpe et al. |
| 5,267,865 A | 12/1993 | Lee et al. |
| 5,302,132 A | 4/1994 | Corder |
| 5,310,349 A | 5/1994 | Daniels et al. |
| 5,313,465 A | 5/1994 | Perlman et al. |
| 5,333,302 A | 7/1994 | Hensley et al. |
| 5,339,435 A | 8/1994 | Lubkin et al. |
| 5,367,698 A | 11/1994 | Webber et al. |
| 5,371,852 A | 12/1994 | Attanasio et al. |
| 5,387,104 A | 2/1995 | Corder |
| 5,410,703 A | 4/1995 | Nilsson et al. |
| 5,423,032 A | 6/1995 | Byrd et al. |
| 5,437,027 A | 7/1995 | Bannon et al. |
| 5,437,555 A | 8/1995 | Ziv-el |

(Continued)

FOREIGN PATENT DOCUMENTS

EP  1 923 279 A2  6/2008

(Continued)

OTHER PUBLICATIONS

U.S. Appl. No. 12/200,814, filed Aug. 28, 2008, Eyes et al.

(Continued)

*Primary Examiner*—Firmin Backer
*Assistant Examiner*—Hamza Algibhah
(74) *Attorney, Agent, or Firm*—Knobbe, Martens, Olson & Bear, LLP

(57) ABSTRACT

An identity migration agent operating on a local identity server and/or user computer retrieves locally managed identities for an identity migration server. The migration server merges the locally managed identities with centrally managed identities according to a plurality of rules, and creates an identity map that maps the locally managed identities to the centrally managed identities. The migration server communicates the identity map to the identity migration agent that reassigns resources of the locally managed identities to the centrally managed identities in accordance with the identity map. In certain embodiments, the migration server performs identity conflict checks and directs resource assignment rollback operations in response to a user request.

13 Claims, 10 Drawing Sheets

U.S. PATENT DOCUMENTS

| | | | |
|---|---|---|---|
| 5,440,719 A | 8/1995 | Hanes et al. | |
| 5,441,415 A | 8/1995 | Lee et al. | |
| 5,497,486 A * | 3/1996 | Stolfo et al. | 707/7 |
| 5,497,492 A | 3/1996 | Zbikowski et al. | |
| 5,499,379 A | 3/1996 | Tanaka et al. | |
| 5,530,829 A | 6/1996 | Beardsley et al. | |
| 5,550,968 A | 8/1996 | Miller et al. | |
| 5,550,976 A | 8/1996 | Henderson et al. | |
| 5,586,304 A | 12/1996 | Stupek, Jr. et al. | |
| 5,590,360 A | 12/1996 | Edwards | |
| 5,600,833 A | 2/1997 | Senn et al. | |
| 5,608,874 A | 3/1997 | Ogawa et al. | |
| 5,608,903 A | 3/1997 | Prasad et al. | |
| 5,623,601 A | 4/1997 | Vu | |
| 5,630,069 A | 5/1997 | Flores et al. | |
| 5,630,131 A | 5/1997 | Palevich et al. | |
| 5,659,735 A | 8/1997 | Parrish et al. | |
| 5,659,736 A | 8/1997 | Hasegawa et al. | |
| 5,666,502 A | 9/1997 | Capps | |
| 5,671,428 A | 9/1997 | Muranaga et al. | |
| 5,673,386 A | 9/1997 | Batra | |
| 5,673,387 A | 9/1997 | Chen et al. | |
| 5,675,782 A | 10/1997 | Montague et al. | |
| 5,677,997 A | 10/1997 | Talatik | |
| 5,680,586 A | 10/1997 | Elkins et al. | |
| 5,692,132 A | 11/1997 | Hogan | |
| 5,692,902 A | 12/1997 | Aeby | |
| 5,694,540 A | 12/1997 | Humelsine et al. | |
| 5,706,502 A | 1/1998 | Foley et al. | |
| 5,708,812 A | 1/1998 | Van Dyke et al. | |
| 5,710,884 A | 1/1998 | Dedrick | |
| 5,711,671 A | 1/1998 | Geeslin et al. | |
| 5,724,521 A | 3/1998 | Dedrick | |
| 5,727,145 A | 3/1998 | Nessett et al. | |
| 5,727,951 A | 3/1998 | Ho et al. | |
| 5,740,427 A | 4/1998 | Stoller | |
| 5,743,746 A | 4/1998 | Ho et al. | |
| 5,745,113 A | 4/1998 | Jordan et al. | |
| 5,745,902 A | 4/1998 | Miller et al. | |
| 5,752,042 A | 5/1998 | Cole et al. | |
| 5,754,173 A | 5/1998 | Hiura et al. | |
| 5,754,938 A | 5/1998 | Herz et al. | |
| 5,758,062 A | 5/1998 | McMahon et al. | |
| 5,758,074 A | 5/1998 | Marlin et al. | |
| 5,758,344 A | 5/1998 | Prasad et al. | |
| 5,764,897 A | 6/1998 | Khalidi | |
| 5,765,140 A | 6/1998 | Knudson et al. | |
| 5,768,519 A * | 6/1998 | Swift et al. | 709/223 |
| 5,774,551 A * | 6/1998 | Wu et al. | 713/155 |
| 5,778,169 A | 7/1998 | Reinhardt | |
| 5,784,553 A | 7/1998 | Kolawa et al. | |
| 5,784,643 A | 7/1998 | Shields | |
| 5,790,801 A | 8/1998 | Funato | |
| 5,796,393 A | 8/1998 | MacNaughton et al. | |
| 5,806,075 A | 9/1998 | Jain et al. | |
| 5,812,669 A | 9/1998 | Jenkins et al. | |
| 5,812,865 A | 9/1998 | Theimer et al. | |
| 5,815,657 A | 9/1998 | Williams et al. | |
| 5,819,265 A | 10/1998 | Ravin et al. | |
| 5,819,281 A | 10/1998 | Cummins | |
| 5,819,295 A | 10/1998 | Nakagawa et al. | |
| 5,822,518 A | 10/1998 | Ooki et al. | |
| 5,835,087 A | 11/1998 | Herz et al. | |
| 5,835,911 A | 11/1998 | Nakagawa et al. | |
| 5,838,918 A | 11/1998 | Prager et al. | |
| 5,844,508 A | 12/1998 | Murashita et al. | |
| 5,848,396 A | 12/1998 | Gerace | |
| 5,859,972 A | 1/1999 | Subramaniam et al. | |
| 5,872,928 A | 2/1999 | Lewis et al. | |
| 5,872,973 A | 2/1999 | Mitchell et al. | |
| 5,878,432 A | 3/1999 | Misheski et al. | |
| 5,889,520 A | 3/1999 | Glaser | |
| 5,890,161 A | 3/1999 | Helland et al. | |
| 5,890,175 A | 3/1999 | Wong et al. | |
| 5,892,898 A | 4/1999 | Fujii et al. | |
| 5,893,074 A | 4/1999 | Hughes et al. | |
| 5,893,076 A | 4/1999 | Hafner et al. | |
| 5,930,512 A | 7/1999 | Boden et al. | |
| 5,937,165 A | 8/1999 | Schwaller et al. | |
| 5,949,419 A | 9/1999 | Domine et al. | |
| 5,956,732 A | 9/1999 | Tsuchida | |
| 5,956,736 A | 9/1999 | Hanson et al. | |
| 5,960,200 A | 9/1999 | Eager et al. | |
| 5,987,247 A | 11/1999 | Lau | |
| 5,995,114 A | 11/1999 | Wegman et al. | |
| 6,002,868 A | 12/1999 | Jenkins et al. | |
| 6,003,047 A | 12/1999 | Osmond et al. | |
| 6,014,669 A | 1/2000 | Slaughter et al. | |
| 6,016,495 A | 1/2000 | McKeehan et al. | |
| 6,029,178 A | 2/2000 | Martin et al. | |
| 6,029,195 A | 2/2000 | Herz | |
| 6,029,247 A | 2/2000 | Ferguson | |
| 6,035,323 A | 3/2000 | Narayen et al. | |
| 6,044,368 A | 3/2000 | Powers | |
| 6,052,512 A | 4/2000 | Peterson et al. | |
| 6,055,538 A | 4/2000 | Kessenich et al. | |
| 6,058,260 A | 5/2000 | Brockel et al. | |
| 6,058,379 A | 5/2000 | Odom et al. | |
| 6,061,643 A | 5/2000 | Walker et al. | |
| 6,061,650 A | 5/2000 | Malkin et al. | |
| 6,067,568 A | 5/2000 | Li et al. | |
| 6,070,184 A | 5/2000 | Blount et al. | |
| 6,076,166 A | 6/2000 | Moshfeghi et al. | |
| 6,079,020 A | 6/2000 | Liu | |
| 6,101,481 A | 8/2000 | Miller | |
| 6,101,503 A | 8/2000 | Cooper et al. | |
| 6,108,649 A | 8/2000 | Young et al. | |
| 6,108,670 A | 8/2000 | Weida et al. | |
| 6,112,228 A | 8/2000 | Earl et al. | |
| 6,112,240 A | 8/2000 | Pogue et al. | |
| 6,115,040 A | 9/2000 | Bladow et al. | |
| 6,115,544 A | 9/2000 | Mueller | |
| 6,134,548 A | 10/2000 | Gottsman et al. | |
| 6,137,869 A | 10/2000 | Voit et al. | |
| 6,138,086 A | 10/2000 | Rose et al. | |
| 6,141,006 A | 10/2000 | Knowlton et al. | |
| 6,141,010 A | 10/2000 | Hoyle | |
| 6,141,647 A | 10/2000 | Meijer et al. | |
| 6,151,600 A | 11/2000 | Dedrick | |
| 6,151,610 A | 11/2000 | Senn et al. | |
| 6,167,445 A | 12/2000 | Gai et al. | |
| 6,167,564 A | 12/2000 | Fontana et al. | |
| 6,170,009 B1 | 1/2001 | Mandal et al. | |
| 6,182,226 B1 | 1/2001 | Reid et al. | |
| 6,185,625 B1 | 2/2001 | Tso et al. | |
| 6,195,794 B1 | 2/2001 | Buxton | |
| 6,199,068 B1 | 3/2001 | Carpenter | |
| 6,199,079 B1 | 3/2001 | Gupta et al. | |
| 6,202,051 B1 | 3/2001 | Woolston | |
| 6,205,480 B1 | 3/2001 | Broadhurst et al. | |
| 6,208,345 B1 | 3/2001 | Sheard et al. | |
| 6,209,000 B1 | 3/2001 | Klein et al. | |
| 6,209,033 B1 | 3/2001 | Datta et al. | |
| 6,222,535 B1 | 4/2001 | Hurd, II | |
| 6,223,221 B1 | 4/2001 | Kunz | |
| 6,230,160 B1 | 5/2001 | Chan et al. | |
| 6,230,194 B1 | 5/2001 | Frailong et al. | |
| 6,230,309 B1 | 5/2001 | Turner et al. | |
| 6,233,584 B1 | 5/2001 | Purcell | |
| 6,237,114 B1 | 5/2001 | Wookey et al. | |
| 6,246,410 B1 | 6/2001 | Bergeron et al. | |
| 6,249,905 B1 | 6/2001 | Yoshida et al. | |
| 6,256,659 B1 | 7/2001 | Mclain, Jr. et al. | |
| 6,256,678 B1 | 7/2001 | Traughber et al. | |

| | | |
|---|---|---|
| 6,260,068 B1 | 7/2001 | Zalewski et al. |
| 6,263,352 B1 | 7/2001 | Cohen |
| 6,266,666 B1 | 7/2001 | Ireland et al. |
| 6,269,405 B1* | 7/2001 | Dutcher et al. ............... 709/248 |
| 6,269,406 B1 | 7/2001 | Dutcher et al. |
| 6,272,673 B1 | 8/2001 | Dale et al. |
| 6,272,678 B1 | 8/2001 | Imachi et al. |
| 6,279,030 B1 | 8/2001 | Britton et al. |
| 6,282,605 B1 | 8/2001 | Moore |
| 6,286,028 B1 | 9/2001 | Cohen et al. |
| 6,286,104 B1 | 9/2001 | Buhle et al. |
| 6,301,601 B1 | 10/2001 | Helland et al. |
| 6,304,893 B1 | 10/2001 | Gish |
| 6,308,164 B1 | 10/2001 | Nummelin et al. |
| 6,308,188 B1 | 10/2001 | Bernardo et al. |
| 6,308,273 B1 | 10/2001 | Goertzel et al. |
| 6,313,835 B1 | 11/2001 | Gever et al. |
| 6,314,434 B1 | 11/2001 | Shigemi et al. |
| 6,327,677 B1 | 12/2001 | Garg et al. |
| 6,330,566 B1 | 12/2001 | Durham |
| 6,336,118 B1 | 1/2002 | Hammond |
| 6,341,287 B1 | 1/2002 | Sziklai et al. |
| 6,345,239 B1 | 2/2002 | Bowman-amuah |
| 6,349,287 B1 | 2/2002 | Hayashi |
| 6,363,398 B1 | 3/2002 | Andersen |
| 6,370,573 B1 | 4/2002 | Bowman Amuah |
| 6,381,579 B1 | 4/2002 | Gervais et al. |
| 6,401,085 B1 | 6/2002 | Gershman et al. |
| 6,401,211 B1 | 6/2002 | Brezak et al. |
| 6,405,364 B1 | 6/2002 | Bowman-amuah |
| 6,430,556 B1 | 8/2002 | Goldberg et al. |
| 6,438,514 B1 | 8/2002 | Hill et al. |
| 6,442,620 B1 | 8/2002 | Thatte et al. |
| 6,446,096 B1 | 9/2002 | Holland et al. |
| 6,453,317 B1 | 9/2002 | Lacost et al. |
| 6,466,932 B1 | 10/2002 | Dennis et al. |
| 6,469,713 B2 | 10/2002 | Hetherington et al. |
| 6,473,794 B1 | 10/2002 | Guheen et al. |
| 6,587,876 B1 | 7/2003 | Mahon et al. |
| 6,615,258 B1 | 9/2003 | Barry et al. |
| 6,678,714 B1 | 1/2004 | Olapurath et al. |
| 6,757,696 B2 | 6/2004 | Multer et al. |
| 6,760,761 B1 | 7/2004 | Sciacca |
| 6,795,835 B2 | 9/2004 | Ricart et al. |
| 6,801,946 B1 | 10/2004 | Child et al. |
| 6,839,766 B1 | 1/2005 | Parnafes et al. |
| 6,880,005 B1 | 4/2005 | Bell et al. |
| 6,925,477 B1 | 8/2005 | Champagne et al. |
| 6,950,935 B1 | 9/2005 | Allavarpu et al. |
| 7,062,781 B2 | 6/2006 | Shambroom |
| 7,080,077 B2 | 7/2006 | Ramamurthy et al. |
| 7,089,584 B1 | 8/2006 | Sharma |
| 7,100,195 B1 | 8/2006 | Underwood |
| 7,133,984 B1 | 11/2006 | Dickensheets |
| 7,143,095 B2 | 11/2006 | Barrett et al. |
| 7,162,640 B2 | 1/2007 | Heath et al. |
| 7,185,073 B1 | 2/2007 | Gai et al. |
| 7,243,370 B2 | 7/2007 | Bobde et al. |
| 7,428,583 B1 | 9/2008 | Lortz et al. |
| 7,440,962 B1* | 10/2008 | Wong et al. ............... 707/102 |
| 7,487,535 B1 | 2/2009 | Isaacson et al. |
| 7,519,813 B1 | 4/2009 | Cox et al. |
| 7,617,501 B2 | 11/2009 | Peterson |
| 2002/0112178 A1 | 8/2002 | Scherr |
| 2002/0129274 A1 | 9/2002 | Baskey et al. |
| 2002/0133723 A1 | 9/2002 | Tait |
| 2002/0169986 A1 | 11/2002 | Lortz |
| 2002/0169988 A1 | 11/2002 | Vandergeest et al. |
| 2002/0174366 A1 | 11/2002 | Peterka et al. |
| 2002/0178377 A1 | 11/2002 | Hemsath et al. |
| 2002/0184536 A1* | 12/2002 | Flavin ............... 713/202 |
| 2003/0018913 A1 | 1/2003 | Brezak et al. |
| 2003/0033535 A1* | 2/2003 | Fisher et al. ............... 713/185 |
| 2003/0065940 A1 | 4/2003 | Brezak et al. |
| 2003/0115313 A1 | 6/2003 | Kanada et al. |
| 2003/0115439 A1 | 6/2003 | Mahalingam et al. |
| 2003/0177388 A1 | 9/2003 | Botz et al. |
| 2003/0229783 A1 | 12/2003 | Hardt |
| 2004/0010519 A1 | 1/2004 | Sinn et al. |
| 2004/0059953 A1 | 3/2004 | Purnell |
| 2004/0088543 A1 | 5/2004 | Garg et al. |
| 2004/0098615 A1 | 5/2004 | Mowers et al. |
| 2004/0111515 A1 | 6/2004 | Manion et al. |
| 2004/0123146 A1 | 6/2004 | Himmel et al. |
| 2004/0128542 A1 | 7/2004 | Blakley et al. |
| 2004/0139050 A1 | 7/2004 | Barrett et al. |
| 2004/0139081 A1 | 7/2004 | Barrett et al. |
| 2004/0260565 A1* | 12/2004 | Zimniewicz et al. ............ 705/1 |
| 2004/0260651 A1 | 12/2004 | Chan et al. |
| 2005/0010547 A1 | 1/2005 | Carinci et al. |
| 2005/0086457 A1 | 4/2005 | Hohman |
| 2005/0091068 A1 | 4/2005 | Ramamoorthy et al. |
| 2005/0091213 A1 | 4/2005 | Schutz et al. |
| 2005/0091250 A1* | 4/2005 | Dunn et al. ................. 707/101 |
| 2005/0091284 A1* | 4/2005 | Weissman et al. ............ 707/200 |
| 2005/0091290 A1 | 4/2005 | Cameron et al. |
| 2005/0108579 A1 | 5/2005 | Isaacson et al. |
| 2005/0114701 A1 | 5/2005 | Atkins et al. |
| 2005/0144463 A1 | 6/2005 | Rossebo et al. |
| 2005/0193181 A1 | 9/2005 | Kaneda et al. |
| 2005/0204143 A1* | 9/2005 | Ellington ................... 713/182 |
| 2005/0223216 A1 | 10/2005 | Chan et al. |
| 2005/0267695 A1* | 12/2005 | Czeczulin ................. 709/206 |
| 2005/0278432 A1* | 12/2005 | Feinleib et al. ............. 709/213 |
| 2005/0283443 A1 | 12/2005 | Hardt |
| 2005/0283614 A1 | 12/2005 | Hardt |
| 2006/0005229 A1 | 1/2006 | Palekar et al. |
| 2006/0010445 A1 | 1/2006 | Peterson et al. |
| 2006/0021017 A1 | 1/2006 | Hinton et al. |
| 2006/0026195 A1* | 2/2006 | Gu et al. ..................... 707/102 |
| 2006/0034494 A1 | 2/2006 | Holloran |
| 2006/0064474 A1* | 3/2006 | Feinleib et al. ............. 709/220 |
| 2006/0085483 A1* | 4/2006 | Mooney et al. ............. 707/200 |
| 2006/0116949 A1 | 6/2006 | Wehunt et al. |
| 2006/0130065 A1 | 6/2006 | Chin et al. |
| 2006/0161435 A1 | 7/2006 | Atef et al. |
| 2006/0174350 A1 | 8/2006 | Roever et al. |
| 2006/0184401 A1 | 8/2006 | DelGaudio et al. |
| 2006/0200424 A1 | 9/2006 | Cameron et al. |
| 2006/0200504 A1* | 9/2006 | Lo ............................. 707/204 |
| 2006/0224611 A1 | 10/2006 | Dunn et al. |
| 2006/0248099 A1 | 11/2006 | Barrett et al. |
| 2006/0282360 A1 | 12/2006 | Kahn et al. |
| 2006/0294151 A1* | 12/2006 | Wong et al. ................. 707/200 |
| 2007/0011136 A1 | 1/2007 | Haskin et al. |
| 2007/0083917 A1 | 4/2007 | Peterson et al. |
| 2007/0100980 A1 | 5/2007 | Kataoka et al. |
| 2007/0143836 A1 | 6/2007 | Bowers et al. |
| 2007/0156767 A1* | 7/2007 | Hoang et al. ............... 707/200 |
| 2007/0192843 A1 | 8/2007 | Peterson |
| 2007/0288992 A1 | 12/2007 | Robinson |
| 2008/0104220 A1 | 5/2008 | Vanyukhin |
| 2008/0133533 A1 | 6/2008 | Ganugapati et al. |
| 2008/0162604 A1 | 7/2008 | Soulet et al. |
| 2010/0050232 A1 | 2/2010 | Peterson et al. |

FOREIGN PATENT DOCUMENTS

WO    WO 2007/044613 A2    4/2007

OTHER PUBLICATIONS

"Description of Digital Certificates", Jan. 23, 2007, http://www.support.microsoft.com/kb/195724.

"Directory Administrator", http://diradmin.open-it.org/indexlphp, p. 1-3.

"Kerberos Module for Apache", http://modauthkerb.sourceforge.net/.
"LDAP Linux HOWTO", http://tldp/org/HOWTO/LDAP-HOWTO/, p. 1-2.
"Lnux Authentication Against Active Directory", http://laaad/sourceforge.netlen/home/htm, p. 1-2.
"NegotiateAuth", http://negotiateauth,mozdev.org/.
"PADL Software Pty Ltd" http://www.padl.com/productslXAD.html, pp. 1-3.
"Project: AD4Unix: Summary", http://sourceforge.netlprojects/adunixl, p. 1-3.
"Replacing NIS with Kerberos and LDAP", http://ofb.netHhess/krbldap/, p. 1-2.
"Sadma", http://sadmas.sourceforge.netlen/indexlhtml. p. 1-2.
"Sun Enterprise Authentication Mechanism Data Sheet", http://wwws.sun.com/jsp_utils/Printpage.jsp?url, pp. 1-4.
A. Leonard, "Embrace, extend, censor", Originally published May 11, 2000 on salon.com, http://archive.salon.com/tech/log/2000/05/11/slashdot_censor/.
AIX 5L Differences Guide Version 5.2 Edition Published Dec. 24, 2002, Excerpt http://proquest.safaribooksonline.com/0738427047/ch091ev1sec13.
Alan H. Harbitter et al., "Performance of Public-Key-Enabled Kerberos Authentication in Large Networks", Proceedings of the IEEE symposium on Security and Privacy. 2001.
Antti Tikkanen, "Active Directory and nss_ldap for Linux: Centralized User Management," printed from http://www.hut.fi/cc/docskerberos/nss_ldap/htm, pp. 1-11, 2004.
Apurva Kumar, "The OpenLDAP Proxy Cache," IBM, India Research Lab, at least as early as May 2003.
David "Del" Elson, "Active Directory and Linux," printed from http://www.securityfocus.com/printable/infocus/1563, pp. 1-11, 2002.
David F. Carr, "What's Federated Identity Management?", eWeek, Nov. 10, 2003, http://www.eweek.com/printarticle/O,1761.a-111811,00.asp.
Documentation for Kerberos V5 release krb5-1.3, Copyright 1985-2002, Installation Guide: http://web.mit.edu/Kerberos/krb5-1.3/krb5-1.3/doc/krb5-user.html.
Documentation for Kerberos V5 release krb5-1.3, Copyright 1985-2002, http://web.mit.edu/KerberosIkrb5-1.3/krb5-1.3/doc/krb5-install.html—System Administrator's Guide.
Documentation for Kerberos V5 release krb5-1.3, Copyright 1985-2002, http://web.mit.edu/Kerberos/krb5-1.3/krb5-1.3/doc/krb5-admin.html—UNIX User's Guide: http://web.mit.edu/Kerberos/krb5-1.3/krb5-1.3/doc/krb5-user.html.
Hank Simon, "SAML:The Secret to Centralized Identity Management", Dec. 2004, http://intelligententerprise.com/showArticle.jhtml?articleID=54200324.
International Preliminary Report on Patentability and Written Opinion for International Application No. PCT/US2006/039302 (QSOFT. 337VPC), mailed on Apr. 2, 2009, in 7 pages.
International Search Report in International Application No. PCT/US2006/039302 (QSOFT.337VPC), mailed on Jul. 3, 2008.
J. Barr, "The Gates of Hades: Microsoft attempts to co-opt Kerberos", Published Apr. 2000 as verified by the Internet Archive, http://web.archive.org/web/20000619011652/http://www.linuxworld.com/linuxworld/lw-2000-04/lw-04-vcontrol_3.html.
J. Brezak, "HTTP Authentication: SPNEGO Access Authentication as Implemented in Microsoft Windows 2000," http://Meta.cesnet.cz/cms/opencms/en/docs/software/devel/draft-brezek-spnego-http-04.xt, pp. 1-6.
J. Kohl et al. "RFC 1510: The Kerberos Network Authentication Service (V5)", Published Sep. 1993, http://ietfreport.isoc.org/rfc/PDF/rfc1510.pdf.
Jan De Clercq, "Win.NET Server Kerberos", http://www.winnetmag.com/WindowsSecurity/ Articlesl ArticleID/26450/pg/3/3.html.
John Brezak, "Interoperability with Microsoft Windows 2000 Active Directory and Kerberos Services," printed from http://msdn.microsft.com/library/en-us/dnactdir/html/kerberossamp.asp?frame=true, pp. 1-4, 2000.

Kerberos, PACs, and Microsoft's Dirty Tricks Originally posted to slashdot.org on May 2, 2000, http://slashdot.org/comments.pl?sid=5268&threshold=1&co mmentsort=O&mode=thread&cid=1096250.
LinuX® and Windows® Interoperability Guide, Published Dec. 14, 2001, Excerpt http://proquest.safaribooksonline.com/0130324779/ch18/lev1sec3.
Matsunaga et al, "Secure Authentication System for Public WLAN Roaming, Proceedings of the 1st ACM international workshop on Wireless mobile applications and services on WLAN hotspots," San Diego, CA, USA, Year of Publication: 2003, p. 113-121.
Matthew Hur, "Session Code: ARC241 architecture & infrastructure", Microsoft Corporation.
NCSA Introduction to Kerberos 5, All right reserved Board of Trustees of the University of Illinois Page last updated May 21, 2002 http://www.ncsa.uiuc.edu/UserInfo/Resources/Software/kerberosold/introduction.html.
Neuman et al., "RFC 4120—The Kerberos Network Authentication Service V5," Network Working Group, Jul. 2005.
Search Security, "Search Security.com Definitions", Jun. 4, 2007, http://searchsecurity.techtarget.com/sDefinition/0,,sid14_gci212437,00.html.
Sixto Ortiz, Jr., "One-Time Password Technology", vol. 29, Issue 15, Apr. 13, 2007, http://www.processor.com/editorial/article.asp?article=articles%2Fp2915%2F30p15%2F30p15.asp.
Subject 2.15. What do I need to do to setup cross-realm authentication?, http://www.cmf.nrl.navy.mil/CCS/people/kenh/kerberos-faq.html.
Turbo Fredriksson, "LDAPv3." printed from http://www.bayour.com/LDAPv3-HOWTO.html, pp. 2-65, 2001.
Wedgetail Communications; "Security Assertion Markup Language (SAML)".
Windows 2000 Kerberos Authentication White Paper, Microsoft Windows 2000 Server, pp. 1-5 and 41-42.
Buell, D.A. et al., "Identity management", Internet Computing, IEEE vol. 7, Issue 6, Nov.-Dec. 2003 pp. 26-28.
Chapter 9 Authentication Protocols, Distributed System & Network Security Lab, Department of Computer Science & Information Engineering, National Chiao Tung University, pp. 21-22.
COSuser—Identity management and user provisioning for Unix, Linux and Microsoft Windows® http://www.cosuser.com/.
Damiani, E., et al, "Managing multiple and dependable identities" Internet Computing, IEEE vol. 7, Issue 6, Nov.-Dec. 2003 pp. 29-37.
Description of Digital Certificates, Jan. 23, 2007, available at http://www.support.microsoft.com/kb/195724.
Designing Network Security Published May 7, 1999. Excerpt http://proquest.safaribooksonline.com/1578700434/ch02lev1sec1.
European Office Action, Application No. 05728119.8-1243 dated Apr. 9, 2009.
Fabini et al., "IMS in a Bottle: Initial Experiences from an OpenSER-based Prototype Implementation of the 3GPP IP Multimedia Subsystem" Mobile Business, 2006. ICMB '06. International Conference on Publication Date: 2006; On pp. 13-13.
Get to One Options for moving from multiple, Unix identities to a single, AD-based authentication infrastructure with Vintela Authentication Services http://www.quest.com/Vintela_Authentication_Services/migration_options_VAS.aspx.
Identity Management for UNIX http://technet2.microsoft.com/WindowsServer/en/library/ab66b7d2-9cfb-4d76-b707-30a5e0dd84f31033.mspx?mfr=true.
Implementing Registry-Based Group Policy for Applications, Microsoft Windows 2000 Server. White Paper.
Introduction to Group Policy in Windows Server 2003, Microsoft Corporation, Published Apr. 2003.
Langella, S. et al., "Dorian: Grid Service Infrastructure for Identity Management and Federation", Computer-Based Medical Systems, 2006. CBMS 2006. 19th IEEE International Symposium on Jun. 22-23, 2006 pp. 756-761.
Li, M., et al., "Identity management in vertical handovers for UMTS-WLAN networks", Mobile Business, 2005. ICMB 2005. International Conference on Jul. 11-13, 2005 pp. 479-484.

MCSE in a Nutshell: The Windows 2000 Exams Published Feb. 2001. Excerpt http://proquest.safaribooksonline.com/0596000308/mcseian-CHP-13-SECT-1.

Mikkonen, H. et al., "Federated Identity Management for Grids" Networking and Services, 2006. ICNS '06. International conference on Jul. 16-18, 2006 pp. 69-69.

Mont, M.C. et al., "Towards accountable management of identity and privacy: sticky policies and enforceable tracing services", Database and Expert Systems Applications, 2003. Proceedings. 14th International Workshop on Sep. 1-5, 2003 pp. 377-382.

Phiri, J. et al., "Modelling and Information Fusion in Digital Identity Management Systems" Networking, International Conference on Systems and International Conference on Mobile Communications and Learning Technologies, 2006. ICN/ICONS/MCL 2006. International Conference on Apr. 23-29, 2006 pp. 181-181.

Quest Software; "UNIX Identity Migration Wizard User Guide", 2006.

Radeke, E., et al. "Framework for object migration in federated database systems", Cooperation Univ. of Paderborn, Germany, Parallel and Distributed Information Systems, 1994., Proceedings of the Third International Conference on Publication Date: Sep. 28-30, 1994, On pp. 187-194.

RFC 4120—"The Kerberos Network Authentication Service V5," Neuman et al., Network Working Group, Jul. 2005.

Shim, S.S.Y et al., "Federated identity management" Computer; vol. 38; Issue 12, Dec. 2005 pp. 120-122.

Shin, D. et al., "Ensuring information assurance in federated identity management", Performance, Computing, and Communications, 2004 IEEE International Conference on 2004 pp. 821-826.

Siddiqi, J. et al., "Secure ICT Services for Mobile and Wireless Communications: A Federated Global Identity Management Framework", Information Technology: New Generations, 2006. ITNG 2006. Third International Conference on Apr. 10-12, 2006 pp. 351-357.

The SLAPD and SLURPD Administrator's Guide, University of Michigan Release 3.3 Apr. 30, 1996, available at http://www.umich.edu/~dirsvcs/Idap/doc/guides/slapd/guide.pdf.

Weitzner, D.J., "In Search of Manageable Identity Systems", IEEE Internet Computing, vol. 10, Issue 6, Nov.-Dec. 2006 pp. 84-86.

Quest Vintela Authentication Services, Administrator's Guide Version 3.1, 2006.

* cited by examiner

Fig. 8

IDENTITY MIGRATION SYSTEM APPARATUS AND METHOD

RELATED APPLICATIONS

This application claims priority to U.S. Provisional Patent Application No. 60/863,569 entitled "Identity Migration System Apparatus and Method" filed on 30 Oct. 2006 for Nikolay Vanyukhin, Alexey Korotich, and Oleg Shevnin. The aforementioned application is incorporated herein by reference.

BACKGROUND OF THE INVENTION

1. Field of the Invention

The present invention relates to migrating network identities. Specifically, the invention relates to apparatus, systems, and methods for migrating network identities to a centralized management server.

2. Description of the Related Art

A single organization may have multiple computer networks. For example, a business may have a separate network for the Human Resources department, the Accounting department, and the Sales department. For a single user to log on to each network, the user must have a user identity registered with each network. As the number of network identities increases, so does the difficulty of managing the identities and the difficulty for each employee to remember their user identification information. Consequently, consolidating identities from multiple networks into a single management system is beneficial.

SUMMARY OF THE INVENTION

The present invention has been developed in response to the present state of the art, and in particular, in response to the problems and needs in the art that have not yet been fully solved by currently available identity migration solutions. Accordingly, the present invention has been developed to provide a system, an apparatus, and a method to centralize identity management that overcome many or all of the above-discussed shortcomings in the art.

In one aspect of the present invention, a method to centralize identity management includes the operations of retrieving locally managed identities from at least one server, merging the locally managed identities with centrally managed identities according to a plurality of rules, creating an identity map that maps the locally managed identities to the centrally managed identities, communicating the identity map to the at least one server, and reassigning resources of the locally managed identities to the centrally managed identities in accordance with the identity map.

In certain embodiments, two or more of the locally managed identities correspond to a non-unique identifier. In certain embodiments, the locally managed identities include one or more identity groups that each includes one or more identities and one or more related identities. In some embodiments, one or more of the centrally managed identities are pre-existing centrally managed identities. In certain embodiments, the locally managed identities and the centrally managed identities correspond to distinct platforms. In certain embodiments, the method includes storing the locally managed identities in a centralized identity data store to facilitate merging the locally managed identities with the centrally managed identities.

In certain embodiments, the method includes performing an identity conflict check. In certain embodiments, the method includes automatically performing one or more method operations in accordance with a schedule. In certain embodiments, the method includes unmerging the locally managed identities from the centrally managed identities and performing an additional identity merge. In certain embodiments, the method includes performing a rollback operation corresponding to reassigning resources of the locally managed identities to the centrally managed identities. In certain embodiments, the method includes suspending and resuming one or more method operations.

In another aspect of the present invention, an apparatus to centralize identity management is presented. In certain embodiments, the apparatus includes a communication module that receives locally managed identities from one or more migration agents. The apparatus may also include an identity merge module that merges locally managed identities with centrally managed identities according to a plurality of rules, an identity map module that creates an identity map for mapping the locally managed identities to the centrally managed identities. The communication module may also communicate the identity map to each of the migration agents.

In certain embodiments, the apparatus includes a scheduling module that enables the scheduling of one or more identity management operations. An identity management operation may include any of the operations described or presented herein or in FIGS. 4-6 as a method step or method operation. In certain embodiments, the identity merge module is configured to unmerge the locally managed identities from the centrally managed identities in response to receiving an unmerge request. In certain embodiments, the identity merge module is also capable of performing an identity conflict check.

In another aspect of the present invention, an apparatus to facilitate centralized identity management is presented. The apparatus may include a communication module that receives a request for locally managed identities and an identity migration agent that retrieves the locally managed identities in accordance with the request. The communication module may also communicate the locally managed identities to an identity migration server, receive an identity map from the identity migration server, and store the identity map in an identity map data store. The identity migration agent may also reassign resources of the locally managed identities to the centrally managed identities in accordance with the identity map. The apparatus may also include an identification module that provides user identification services via the identity map for locally managed identities as though the locally managed identities were centrally managed identities.

In another aspect of the present invention, a system to centralize identity management is presented. The system may includes a centralized identity server that stores identity information for a plurality of users, an identity migration agent that retrieves locally managed identities and communicates the locally managed identities to an identity migration server. The identity migration server receives the locally managed identities, merges the locally managed identities with centrally managed identities according to a plurality of rules, creates an identity map, and communicates the identity map to the identity migration agent that reassigns resources of locally managed identities with centrally managed identities. In certain embodiments, the system also includes a web server that enables a user to specify the plurality of rules.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 7-10 are screenshot diagrams of an interface for selecting a rule for merging identities.

DETAILED DESCRIPTION OF THE INVENTION

Figure 1:
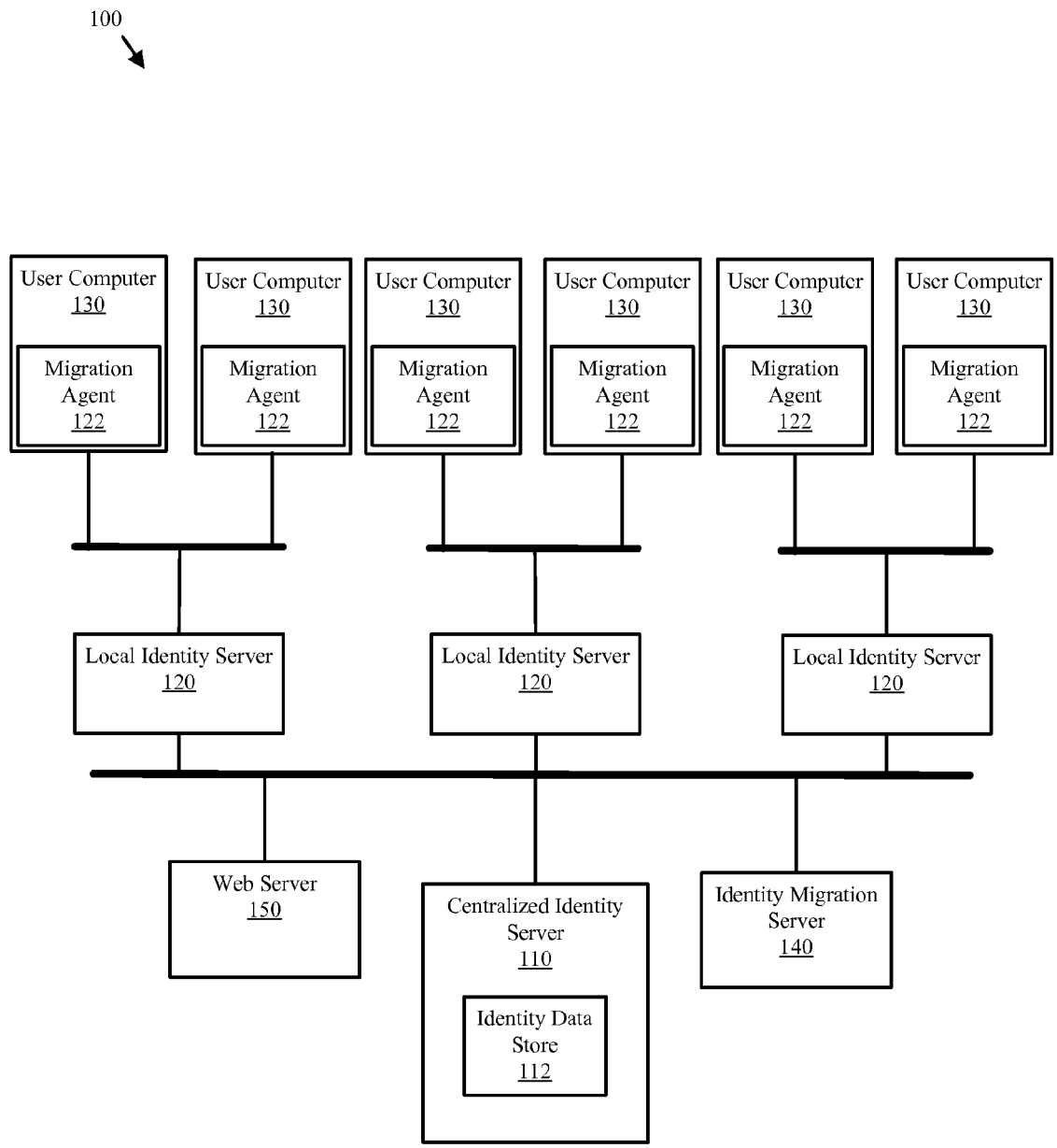
FIG. 1 is a block diagram of one embodiment of an identity migration system in accordance with the present invention.

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in the attached Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Reference to a computer readable storage medium may take any form capable of storing a program of machine-readable instructions that is executable on a digital processing apparatus. For example, a computer readable storage medium may be embodied by a compact disk, a digital-video disk, a magnetic tape, a Bernoulli drive, a magnetic disk, a punch card, flash memory, integrated circuits, or other digital processing apparatus memory device.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The features, structures, or characteristics of the invention described throughout this specification may be combined in any suitable manner in one or more embodiments. For example, reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," or similar language throughout this specification do not necessarily all refer to the same embodiment and the described features, structures, or characteristics may be combined in any suitable manner in one or more embodiments.

FIG. 1 is a block diagram of one embodiment of an identity migration system 100 in accordance with the present invention. The depicted system 100 includes a centralized identity server 110, one or more local identity servers 120, one or more user computers 130, an identity migration server 140, and a web server 150. The various components of the system 100 cooperate to migrate locally managed identities to centrally managed identities.

In certain embodiments, the centralized identity server 110 stores identity information in an identity data store 112. In the depicted embodiment, the identity migration server 140 receives locally managed identities from the identity migration agents 122 operating on the user computers 130. In one embodiment, the migration agents 122 operate on the local identity servers 120. The identity migration server 140 may merge the locally managed identities with centrally managed identities according to a plurality of rules. In certain embodiments, the web server 150 enables a user to participate in the identity migration process by providing an interface for identifying locally managed identities of interest, specifying migration rules, initiating rollback operations, and more.

The identity migration server 140 may also create an identity map that maps the locally managed identities to the centrally managed identities and communicate the identity map to the identity migration agents 122. The identity migration agents 122 may reassign resources of the locally managed identities to the centrally managed identities in accordance with the identity map. Via the identity map, the local identity server 120 may provide identification and, in certain embodiments authentication services, to locally managed identities as though the locally managed identities were centrally managed identities. In this manner, the system 100 enables a user to consolidate multiple locally managed identities into one or more centrally managed identities to facilitate identity management.

Figure 2:
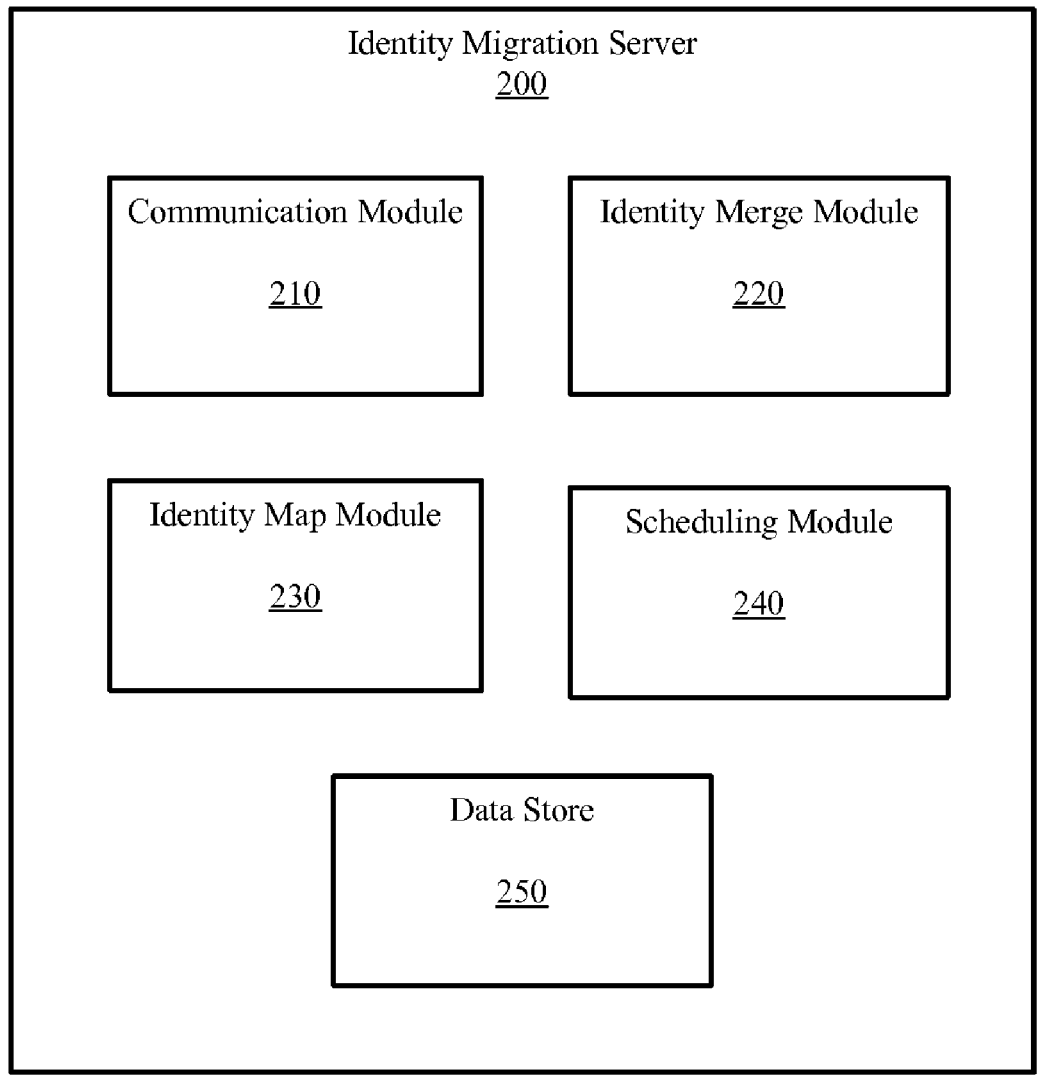
FIG. 2 is a block diagram of one embodiment of an identity migration server in accordance with the present invention.

FIG. 2 is a block diagram of one embodiment of an identity migration server 200 in accordance with the present invention. The depicted identity migration server 200 includes a communication module 210, an identity merge module 220, an identity map module 230, a scheduling module 240, and a data store 250. The components of the identity migration server 200 cooperate to migrate locally managed identities to centrally managed identities.

In certain embodiments, the communication module 210 receives locally managed identities from one or more migration agents. In certain embodiments, the locally managed identities are stored in the data store 250 which may also include data for centrally managed identities. The identity merge module 220 may merge the locally managed identities with the centrally managed identities and the identity map module 230 may create an identity map that maps the locally managed identities with the centrally managed identities. In certain embodiments, the communication module 210 communicates the identity map to the migration agents 122. In certain embodiments, the scheduling module 250 provides a schedule for performing the identity migration operations as described herein.

In certain embodiments, at least some of the locally managed identities are non-unique identities (i.e. identities from two domains with the same identifier for different persons). In some embodiments, at least some of the locally managed identities are associated with one or more identity or user groups. In some embodiments, some of the centrally managed identities are pre-existing identities such that migrating a locally managed identity does not include creating a new centrally managed identity. Accordingly, the present invention provides a solution for migrating non-unique identities, identity groups, identities of distinct platforms, and locally managed identities into pre-existing centrally managed identities.

In certain embodiments, the locally managed identities and the centrally managed identities may correspond to distinct platforms. In some embodiments, the identity merge module 220 may also perform one or more identity unmerge operations. For example, an unmerge operation may be performed in response to a user request or an identity merge error. As such, the identity migration server 200 enables the migration of locally managed identities to centrally managed identities in many contexts. More information regarding the handling of such contexts is found in the description of FIGS. 3-6.

Figure 3:
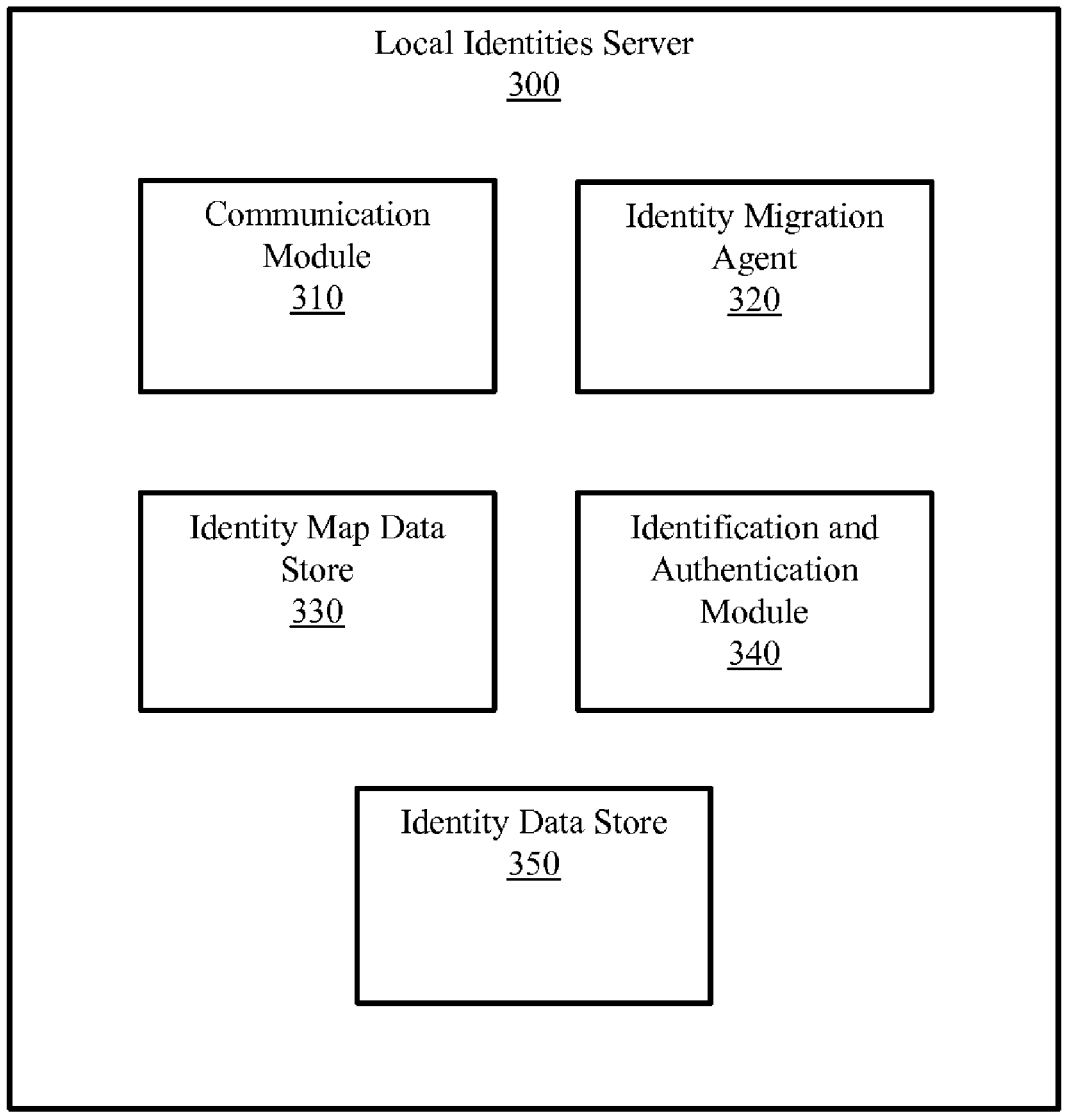
FIG. 3 is a block diagram of one embodiment of a local identity server in accordance with the present invention.

FIG. 3 is a block diagram of one embodiment of a local identity server 300 in accordance with the present invention. The depicted local identity server 300 includes a communication module 310, an identity migration agent 320, an identity map data store 330, an identification and authentication module 340, and an identity data store 350. In some embodiments, the local identity server 300 corresponds to the local identity servers 120 of FIG. 1. In one embodiment, the identity migration agent 320 corresponds to the migration agent 122, and may be located on the user computer 130 or with the local identity server 120.

In certain embodiments, the communication module 310 receives a request for locally managed identities. In certain embodiments, the identity migration agent 320 retrieves the locally managed identities in accordance with the request. The communication module 310 may communicate the locally managed identities to an identity migration server. The communication module 310 may also receive an identity map from the identity migration server and store the identity map in the identity map data store 350.

In certain embodiments, the identity map provides a map of the locally managed identities with centrally managed identities. The identity migration agent 320 may reassign resources of the locally managed identities to the centrally managed identities in accordance with the identity map. In certain embodiments, the identification and authentication module 340 provides user identification services via the identity map for locally managed identities as though the locally managed identities were centrally managed identities. The identification and authentication module 340 may include pluggable identification and/or authentication modules that facilitate identifying and authenticating users. In one embodiment, the present invent invention may be introduced into one or more existing networks and then conveniently removed after any desired identity migration operations have been completed.

In certain embodiments, the identity migration agent 320 performs a resources assignment rollback. The resources assignment rollback may be in response to receiving a request from a user or receive a request from a migration server, web server, or centralized identity management server (see FIG. 1). In this manner, the local identity server 300 operates to facilitate the migration of locally managed identities with centrally managed identities.

Figure 4:
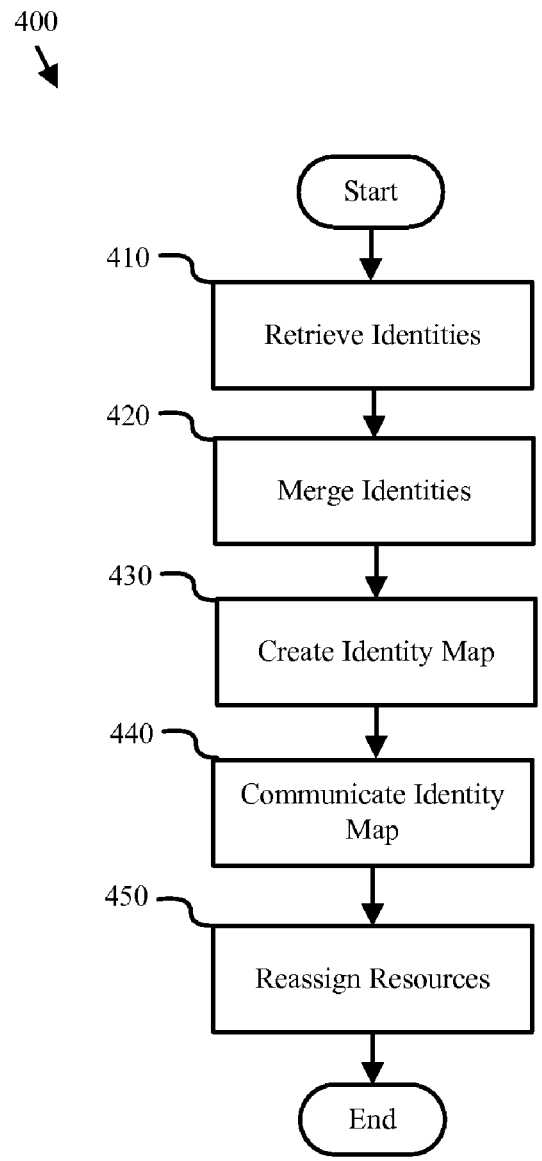
FIG. 4 is a flow chart diagram of one embodiment of a method to migrate network identities in accordance with the present invention.

FIG. 4 is a flow chart diagram of one embodiment of a method 400 to migrate network identities in accordance with the present invention. The depicted method 400 includes the operations of retrieving 410 locally managed identities, merging 420 the locally managed identities with centrally managed identities, creating 430 an identity map of the locally managed identities and the centrally managed identities, communicating 440 the identity map to a local identity server, and reassigning 450 resources owned by the locally managed identities to the centrally managed identities. The operations of the method 400 provide a solution for migrating locally managed identities to centrally managed identities.

Retrieving 410 locally managed identities may include an identity migration server issuing a request to a migration agent operating on a local identity server. Retrieving 410 may also include the migration agent collecting the locally managed identities and communicating the locally managed identities to the identity migration server. Merging 420 the locally managed identities with centrally managed identities may include merging locally managed identity with centrally managed identities according to a plurality of rules.

Creating 430 an identity map may include creating an identity map that maps the locally managed identities with centrally managed identities. Communicating 440 the identity map may include an identity migration server communicating the identity map to a migration agent operating on a local identity server. Reassigning 450 resources may include a migration agent operating on a local identity server to reassign resource of locally managed identities to centrally managed identities in accordance with the identity map. As such, providing an identity map facilitates certain identity migration operations by providing a reference that simplifies the identity migration process.

Figure 5:
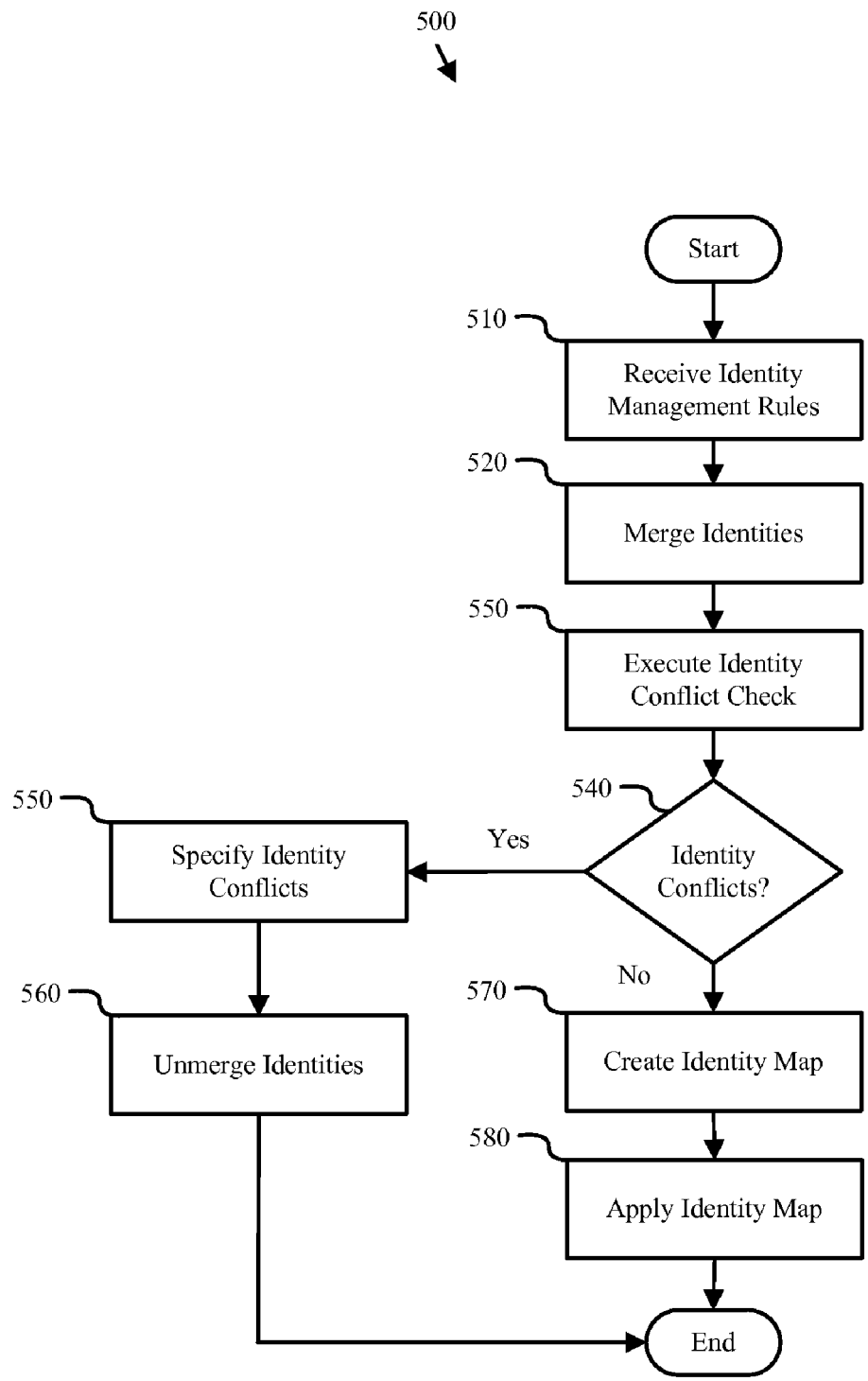
FIG. 5 is one embodiment of a method to merge locally managed identities with centrally managed identities in accordance with the present invention.

FIG. 5 is one embodiment of a method 500 to merge locally managed identities with centrally managed identities in accordance with the present invention. The depicted method 500 includes the operations of receiving 510 identity migration rules, merging 520 locally managed identities with centrally managed identities, executing 530 an identity conflict check, determining 540 whether an identity conflict has occurred, specifying 550 the identity conflicts, unmerging 560 identities, creating 570 an identity map, and applying the identity map 580. The various operations of the method provide only one of many possible solutions for merging locally managed identities in accordance with the present invention.

Receiving 510 identity management rules may include receiving one or more rules for merging locally managed identities with centrally managed identities. The plurality or rules may include instructions for handling user names, user groups, merge errors, and more. Merging 520 identities may include merging locally managed identities with centrally managed identities in accordance with the identity management rules. Accordingly, the present invention provides for flexibility and customization as a user may specify rules for migrating identities.

Executing 530 an identity conflict check may include performing an operation to determine 540 whether recently merged identities results in a conflict or other undesirable scenario. Specifying 550 identity conflicts may include identifying the number and type of conflicts that result from the identity conflict check. Specifying 550 conflicts may enable a user to address the seriousness and nature of an identity conflict in order to address the situation and thereby ensure that all identities are migrated properly. Unmerging 560 identities may include completely unmerging the merge operation 520.

In certain scenarios, enabling a user to unmerge 560 identities saves considerable time and effort and enables a user to enter more appropriate rules for a merge or otherwise address identity conflicts. Creating 570 an identity map may include mapping locally managed identities with centrally managed identities which facilitates the entire identity migration process. Applying 580 an identity map may include communicating the identity map to the identity migration agent 320. In certain embodiments, one or more of the operations in the method 500 may be performed in accordance with a schedule specified by a user.

Figure 6:
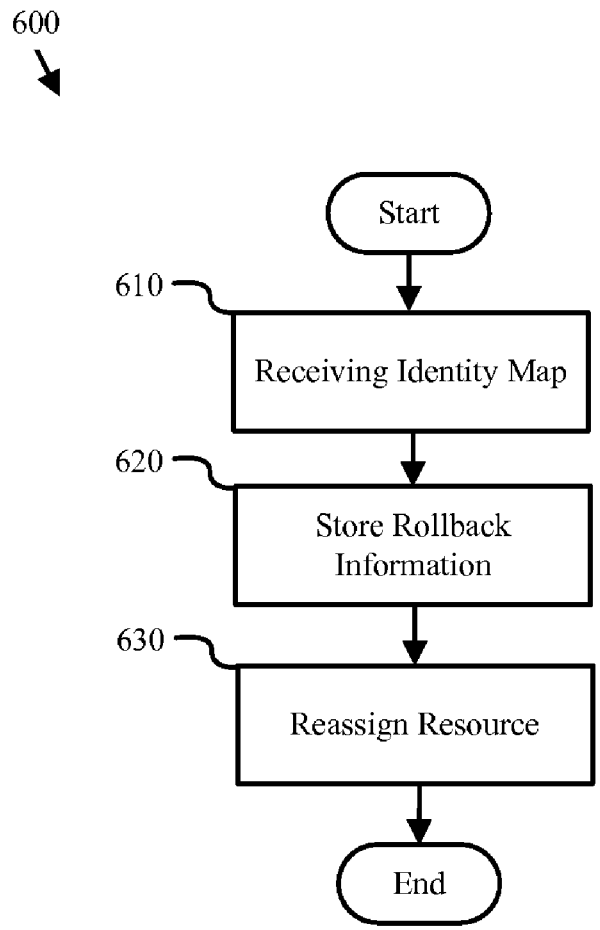
FIG. 6 is a flow chart diagram of one embodiment of a method to reassign ownership of network resources in accordance with the present invention.

FIG. 6 is a flow chart diagram of one embodiment of a method 600 to reassign resources in accordance with the present invention. The depicted method 600 includes the operations of receiving 610 an identity map, storing 620 rollback information, and reassigning 630 a resource. The operations of the method 600 are only one of many possible methods for reassigning ownership of resources in accordance with the present invention. Reassigning resources ownership enables a more complete migration of locally managed identities to centrally managed identities such that the resources owned by multiple locally managed identities may be assigned to a single, centrally managed identity.

Receiving 610 an identity map may include a migration agent or local identity server receiving an identity map from an identity migration server. As suggested above, creation of an identity map may occur after locally managed identities are merged with centrally managed identities. Storing 620 rollback information may include storing information and/or instructions necessary to rollback the reassignment of locally managed identity resources to centrally managed identities.

Reassigning 630 resources may include an identity migration server communicating a resources reassignment request to a migration agent and the migration agent reassigning network resources owned by locally managed identities to centrally managed identities in accordance with the identity map. A resource may include security clearances, access to data, administrative privileges, rights and privileges assignable to an identity, and more. In some embodiments, the method 600 may operate according to a schedule specified by a user. Such a schedule may include the time and date to perform the method 600 one or more of the method operations.

Figure 7:
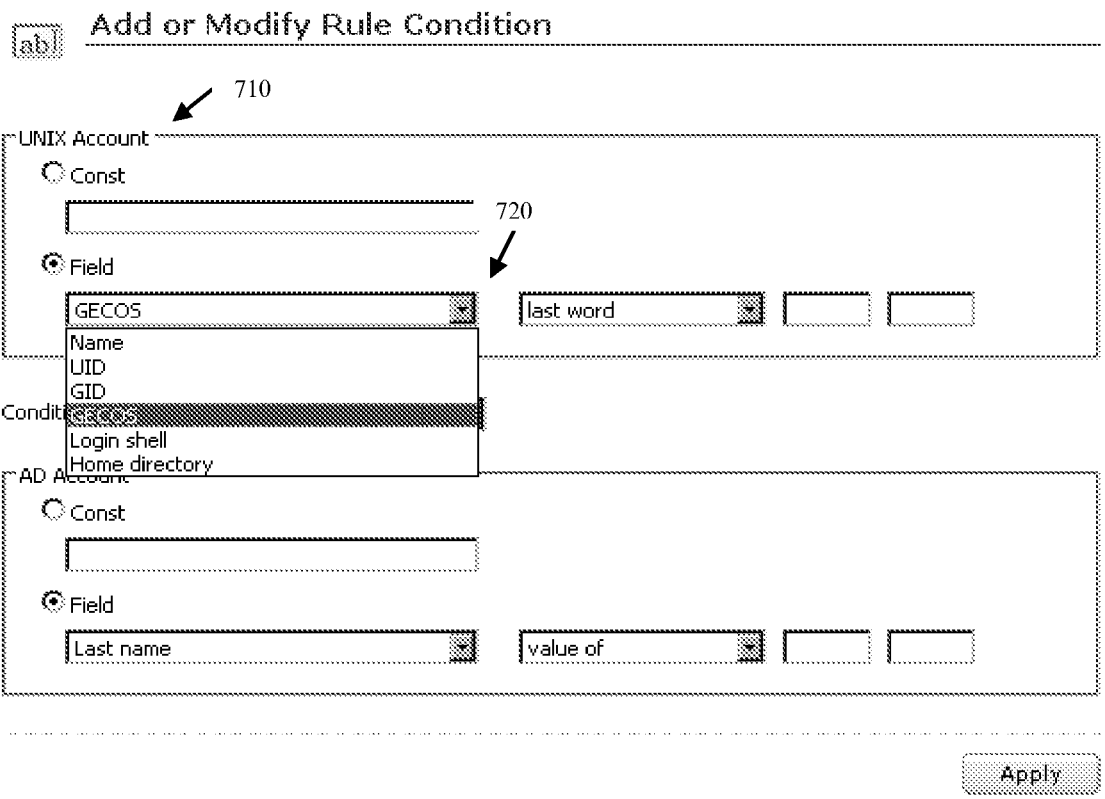
Figure 8:
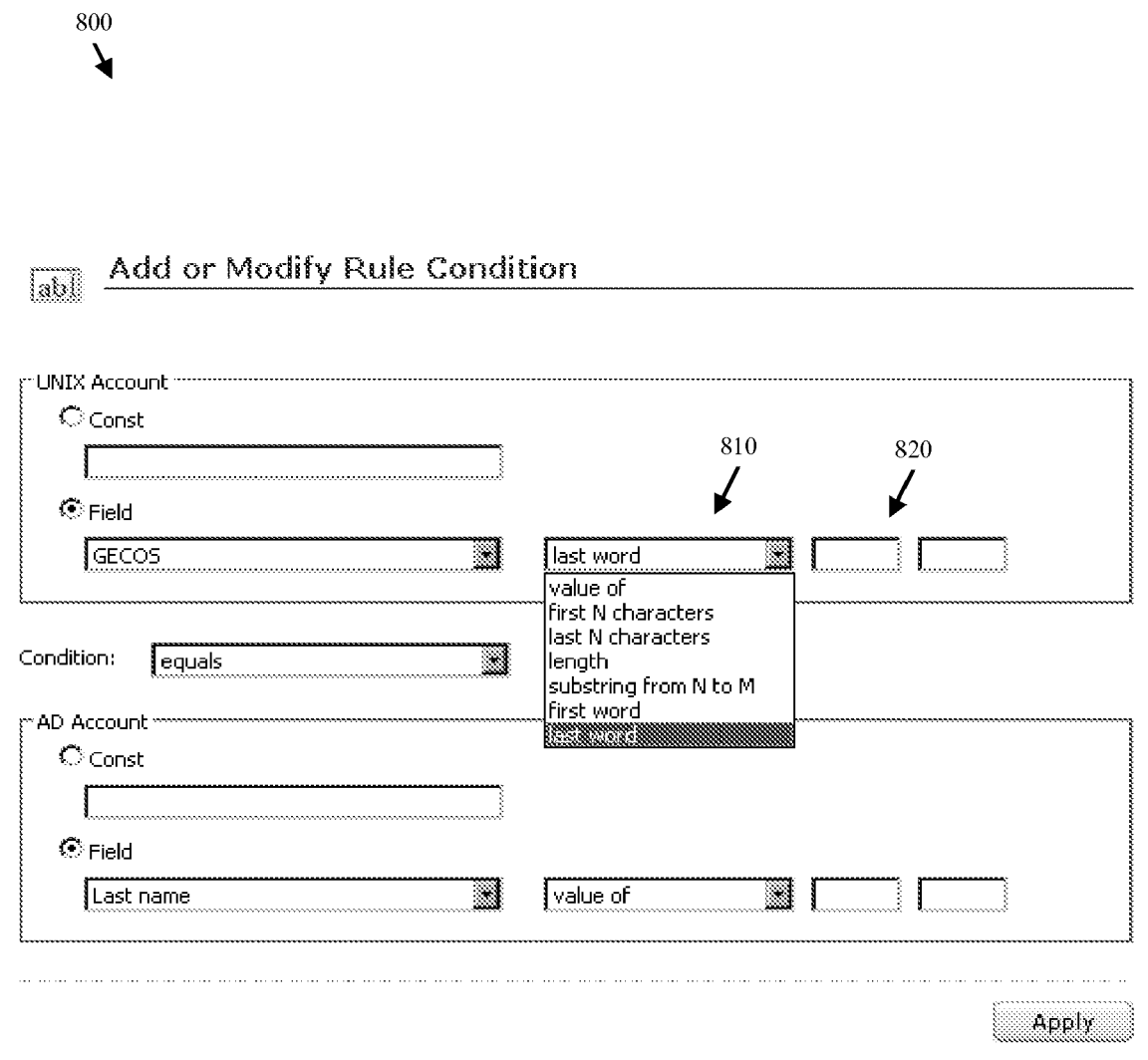

FIGS. 7-10 are screenshot diagrams of an interface 700-1000 for creating a rule for merging identities. Referring specifically to FIG. 7, under the UNIX portion 710 of the interface 700, a user may select a UNIX field via the drop down menu 720. As depicted, a user may select from the fields: Name, UID, GID, GECOS, Login shell, or Home directory. Referring to FIG. 8, a user may further specify how UNIX identities are to be merged by selecting from a qualifier drop down menu 810 such qualifiers as: value of field, first N characters, Last N characters, and so on. A user may also enter characters that satisfy the qualifier 810 in the text boxes 820. In this manner a user may specify identities to be merged by selecting an identity field of interest with certain values.

Figure 9:
Figure 10:

Referring now to FIG. 9, a user may specify a condition via the drop down menu 910. The condition is the manner in which one identity will be compared to others. As depicted, the conditions include: equals, does not equal, is greater than, is greater than or equal to, and so on. Referring to FIG. 10, similar to the qualifier drop down menu 810 and text boxes 820 of FIG. 8 a user may specify a value via the Active Directory (AD) value drop down menu 1020, after selecting the appropriate field category from the 'Field' drop down menu 1010, and then enter specific characters for the value in the text boxes 1030. As such, a user may customize a rule for merging identities.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to centralize identity management, the method comprising:

retrieving locally managed user identities for a plurality of users of Unix from at least one server;

merging with one or more computer processors the locally managed user identities for the plurality of users of Unix with centrally managed identities associated with a plurality of users of Active Directory according to a plurality of rules wherein the merged locally managed user identities and the centrally managed user identities comprise unique identities and at least a plurality of non-unique identities, the non-unique identities comprising user identities that have the same identifier for at least two different users from two distinct domains;

performing an identity conflict check of the merged locally managed user identities and the centrally managed user identities to identify conflicts associated with the non-unique identities;

when conflicts are identified, unmerging the merged locally managed user identities causing the conflicts from the centrally managed user identities prior to migrating the merged locally managed user identities to the centrally managed user identities;

when conflicts do not exist, creating an identity map with one or more computer processors that maps the merged locally managed user identities associated with Unix to the centrally managed user identities associated with Active Directory prior to migrating the merged locally managed user identities to the centrally managed user identities;

communicating the identity map to the at least one server; and migrating the merged locally managed user identities associated with Unix to the centrally located user identities associated with Active Directory based on the identity map;

reassigning resources of the merged locally managed user identities to the centrally managed user identities in accordance with the identity map, wherein the resources comprise at least administrative privileges for the locally managed user identities; and storing rollback information to enable rollback of the migration of the merged locally managed user identities from the centrally managed user identities and rollback of the reassigned resources.

2. The method of claim 1, wherein the locally managed user identities comprise at least one identity group that comprises at least one user identity and at least one related user identity.

3. The method of claim 1, wherein at least one of the centrally managed user identities comprises a pre-existing centrally managed user identity.

4. The method of claim 1, wherein the locally managed user identities and the centrally managed user identities correspond to distinct platforms.

5. The method of claim 1, further comprising storing the locally managed user identities in a centralized identity data store to facilitate merging the locally managed user identities with the centrally managed user identities.

6. An apparatus to centralize identity management, the apparatus comprising:

a communication module configured to receive locally managed user identities for a plurality of users of Unix from at least one migration agent;

an identity merge module implemented on one more computer processors, the identity merge module configured to merge locally managed user identities for a plurality of user of Unix with centrally managed user identities associated with a plurality of users of Active Director according to a plurality of rules wherein the merged locally managed user identities and the centrally managed user identities comprise unique identities and at least a plurality of non-unique identities, the non-unique identities comprising user identities that have the same identifier for at least two different users from two distinct domains;

an identity check module implemented in one or more computer processors, the identity check module configured to perform an identity conflict check of the merged locally managed user identities and the centrally managed user identities to identify conflicts associated with the non-unique identities;

when conflicts are identified, unmerging the merged locally managed user identities causing the conflicts from the centrally managed user identities prior to migrating the merged locally managed user identities to the centrally managed user identities;

an identity map module implemented in one or more computer processors, the identity map module configured to create, when conflicts do not exist, an identity map that maps the merged locally managed user identities associated with Unix to the centrally managed user identities associated with Active Directory prior to migrating the merged locally managed user identities to the centrally managed user identities;

the communication module configured to communicate the identity map to the at least one migration agent, wherein the migration agent is configured to migrate the merged locally managed user identities associated with Unix to the centrally located user identities associated with Active Directory based on the identity map and reassign resources of the merged locally managed user identities to the centrally managed user identities in accordance with the identity map, wherein the resources comprise at least administrative privileges for the locally managed user identities, wherein the migration agent is further configured to store rollback information to enable rollback of the migration of the merged locally managed user identities from the centrally managed user identities and rollback of the reassigned resources.

7. The apparatus of claim 6, wherein the locally managed user identities comprise at least one identity group that comprises at least one user identity and at least one related user identity.

8. The apparatus of claim 6, wherein at least one of the centrally managed user identities comprises a pre-existing centrally managed user identity.

9. The apparatus of claim 6, wherein the locally managed user identities and the centrally managed user identities correspond to distinct platforms.

10. The apparatus of claim 6, further comprising a centrally managed identity data store configured to store the locally managed user identities to facilitate merging the locally managed user identities with centrally managed user identities.

11. The apparatus of claim 6, further comprising a scheduling module configured to enable scheduling one or more identity management operations.

12. The apparatus of claim 6, wherein the identity merge module is further configured to unmerge the locally managed user identities from the centrally managed user identities in response to receiving an unmerge request.

13. A non-transitory computer readable storage medium comprising a program of machine-readable instructions executable by a digital processing apparatus to perform operations to centralize user identity management, the operations comprising:

retrieving locally managed user identities for a plurality of user of Unix from at least one server;

merging the locally managed user identities for the plurality of users of Unix with centrally managed user identities associated with a plurality of users of Active Directory according to a plurality of rules;

wherein the merged locally managed user identities and the centrally managed user identities comprise unique identities and at least a plurality of non-unique identities, the non-unique identities comprising user identities that have the same identifier for at least two different users from two distinct domains;

performing an identity conflict check of the merqed locally managed user identities and the centrally managed user identities to identify conflicts associated with the non-unique identities;

when conflicts are identified, unmerqinq the merged locally managed user identities causing the conflicts from the centrally managed user identities prior to migrating the merged locally managed user identities to the centrally managed user identities;

when conflicts do not exist, creating an identity map that maps the merged locally managed user identities associated with Unix to the centrally managed user identities associated with Active Directory prior to migrating the merged locally managed user identities to the centrally managed user identities;

communicating the identity map to the at least one server; and migrating the merged locally managed user identities associated with Unix to the centrally located user identities associated with Active Directory based on the identity map;

reassigning resources of the merged locally managed user identities to the centrally managed user identities in accordance with the identity map, wherein the resources comprise at least administrative privileges for the locally managed user identities; and storing rollback information to enable rollback of the migration of the merged locally managed user identities from the centrally managed user identities and rollback of the reassigned resources.

* * * * *

UNITED STATES PATENT AND TRADEMARK OFFICE
CERTIFICATE OF CORRECTION

PATENT NO. : 7,895,332 B2
APPLICATION NO. : 11/926512
DATED : February 22, 2011
INVENTOR(S) : Nikolay Vanyukhin, Oleg Shevnin and Alexey Korotich It is certified that error appears in the above-identified patent and that said Letters Patent is hereby corrected as shown below:

On Title Page 4, Item (56) Line 5, Under Other Publications, please change ""Lnux" to --"Linux--.

At Column 9, Line 57, in Claim 6, please change "Director" to --Directory--.

At Column 11, Line 4, in Claim 13, please change "merqed" to --merged--.

At Column 11, Line 8, in Claim 13, please change "unmerqing" to --unmerging--.

Signed and Sealed this
Sixth Day of March, 2012

David J. Kappos
*Director of the United States Patent and Trademark Office*